United States Patent [19]

Sterner, Jr.

[11] Patent Number: 4,941,653
[45] Date of Patent: Jul. 17, 1990

[54] COMBINATION NEWSPAPER AND TRASH RECEPTACLE

[76] Inventor: James G. Sterner, Jr., R.R. 4, Box 60, Sewell, N.J. 08080

[21] Appl. No.: 376,983

[22] Filed: Jul. 7, 1989

[51] Int. Cl.⁵ .............................................. B65D 85/62
[52] U.S. Cl. ...................................... 220/1 T; 100/34; 211/50; 220/8; 220/22; 232/43.1
[58] Field of Search ................... 206/449, 451; 211/50; 220/1 T, 8, 22; 232/1 C, 43.1, 43.2; 100/34

[56] References Cited

U.S. PATENT DOCUMENTS

| | | | |
|---|---|---|---|
| 1,013,775 | 1/1912 | Hoffman | 220/1 T |
| 1,021,872 | 4/1912 | Kingsbury | 220/1 T |
| 2,639,037 | 5/1953 | Friend | 100/34 |
| 3,038,403 | 6/1962 | Orelind | 100/34 |
| 3,145,646 | 8/1964 | Levy | 100/34 |
| 3,800,503 | 4/1974 | Maki | 53/390 |
| 3,856,173 | 12/1974 | Deane et al. | 220/1 T |
| 4,084,495 | 4/1978 | Paul | 100/34 |
| 4,176,747 | 12/1979 | Aho | 206/509 |
| 4,294,379 | 10/1981 | Bard | 220/404 |
| 4,349,123 | 9/1982 | Yang | 220/407 |
| 4,660,758 | 4/1987 | Tavel et al. | 232/43.2 |
| 4,715,572 | 12/1987 | Robbins et al. | 248/101 |
| 4,721,226 | 1/1988 | Yurko | 220/407 |
| 4,736,915 | 4/1988 | Miller et al. | 220/1 T |
| 4,821,903 | 4/1989 | Hayes | 220/1 T |

Primary Examiner—Jimmy G. Foster
Attorney, Agent, or Firm—Charles F. Duffield

[57] ABSTRACT

A combination trash receptacle for storing newspapers and other trash separately which includes a lower newspaper receptacle formed of a receptacle base having a floor and upwardly extending walls for receipt of the newspapers and positioned thereupon an upper trash receptacle having a floor therein and upwardly extending walls and dimensioned so as to nest upon the lower newspaper receptacle. A newspaper slot is positioned within one of the walls of the upper trash receptacle to permit passage of newspapers into the lower newspaper receptacle. A binding twine receptacle receives a ball of twine and dispenses the twine to a shuttle bar operating within a shuttle bar channel within the receptacle base to permit passage of the twine beneath the newspapers to aid in binding of the newspapers when the upper and lower receptacles are separated. An air vent in the back wall of the upper trash receptacle aids in insertion and withdrawal of trash bags.

9 Claims, 3 Drawing Sheets

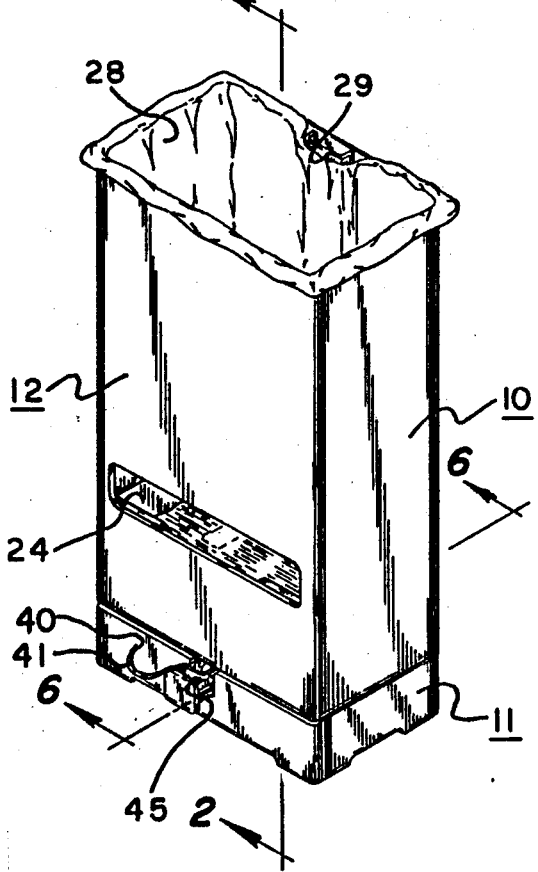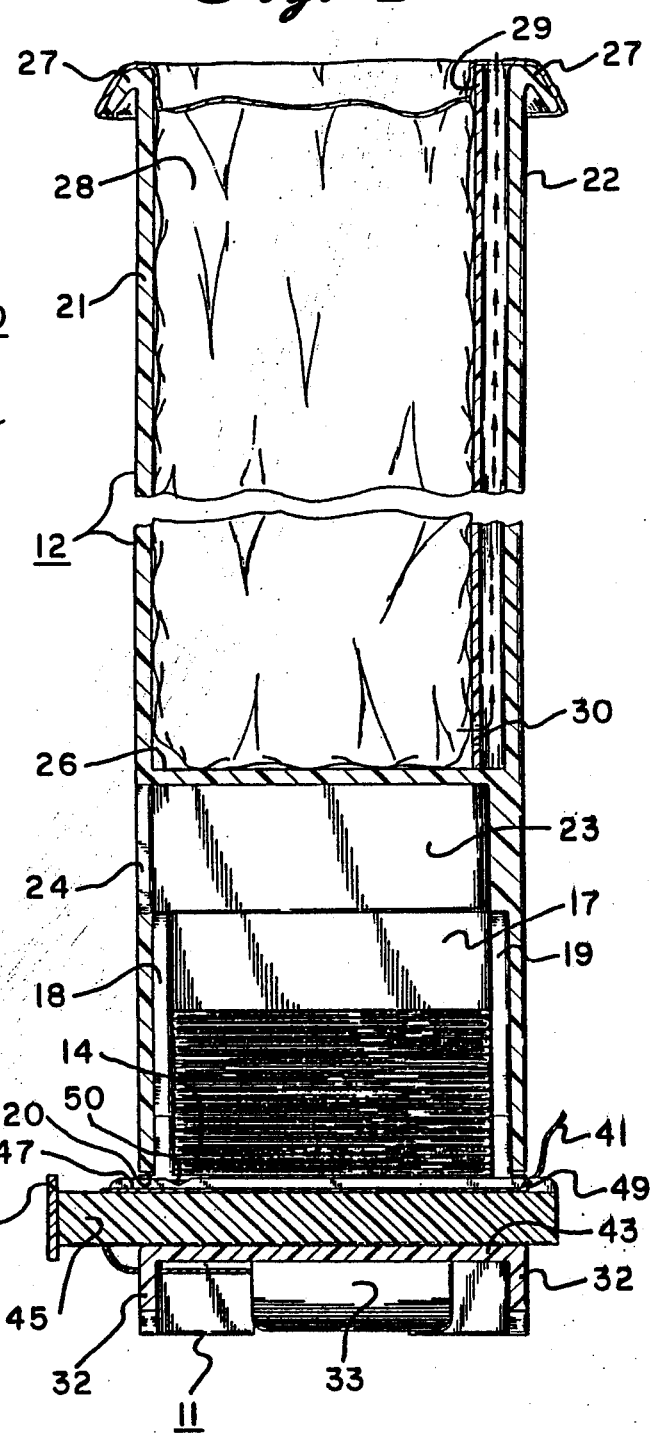

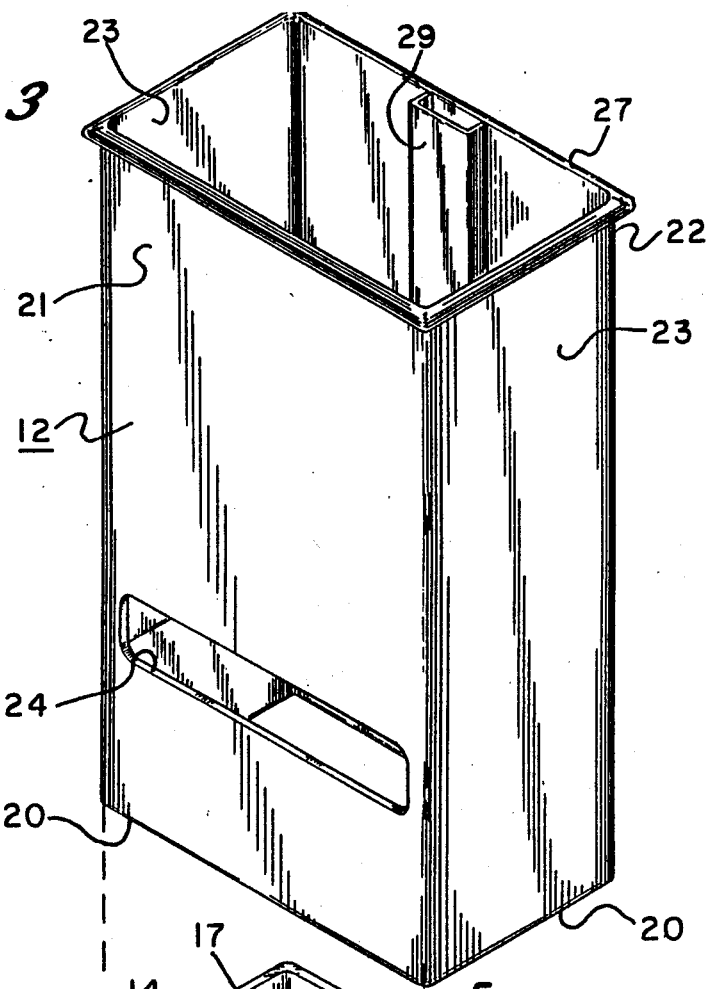
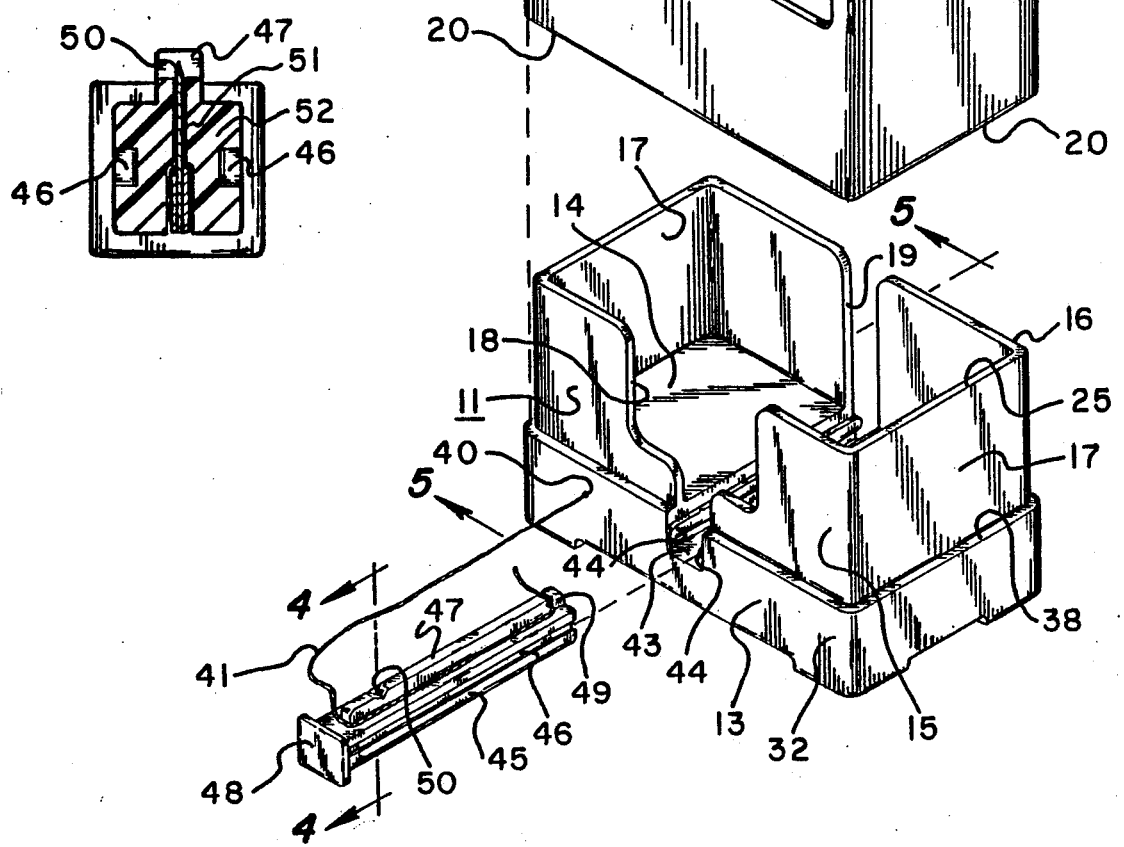

COMBINATION NEWSPAPER AND TRASH RECEPTACLE

BACKGROUND OF INVENTION

The present invention relates to trash receptacles and, more particularly, to trash receptacles which are capable of storing different natures of trash within separate compartments.

Historically, newspapers have always been thrown out with the other usual household trash such as garbage, other paper products and various other rubbish. As modern times have approached, ordinary household newspapers have become larger and larger in their volume. Additionally, more and more companies are advertising through the mail by means of catalogs, circulars and the like. Accordingly, there has been an ever increasing volume of household flat printed material which has to be disposed of on a regular basis.

As the population grows in metropolitan areas, the volume of newspapers and other flat printed material requiring disposal likewise increases as well. All of this has brought an ever increasing pressure upon trash disposal facilities such as landfills, incinerators and the like.

As a consequence of the foregoing, the pressure upon the environment has resulted in state, county and municipal authorities enacting regulations in a vast majority of the metropolitan areas of the United States to the effect that newspapers and other flat printed material must be separated from other household trash and rubbish prior to being placed for pick up by the appropriate municipal authority for disposal. Some municipalities have even gone to the extent that such flat printed material is required to be appropriately bound prior to being placed for pick up.

Under the new regulations, a household can no longer mix the newspapers with the remainder of the trash and rubbish to be disposed of but must maintain the newspapers and other flat printed material in separate stacks or piles somewhere about the house and thereafter appropriately bind the material for placement at the appropriate municipal pick up point. These randomly stacked bundles of newspapers and the like about the house create an unsightly and cumbersome problem.

As a result of the foregoing, there does exist a need for an appropriate and convenient manner within which newspapers to be disposed of can readily and conveniently be stored prior to their disposal and also be appropriately and neatly bound at the time they are to be placed for pick up.

SUMMARY OF INVENTION

The combination trash receptacle of the present invention overcomes the problems of trying to separately store newspapers and other flat printed material separately from the remainder of the household trash and rubbish and provides a combination trash receptacle for storing both newspapers in one portion thereof and the remainder of the household trash in another portion thereof in a neat, orderly and practical manner.

The trash receptacle of the present invention includes a lower newspaper receptacle which has a receptacle base with a floor superimposed thereupon which is of length and breadth of that of a common newspaper and further has upward extending front, rear and opposed side walls. An upper trash receptacle is provided which has front, rear and opposed side walls which are dimensioned to nest with and upon the lower newspaper receptacle walls. The upper trash receptacle has a floor therein positioned to be slightly above the upper edges of the walls of the lower newspaper receptacle.

A newspaper slot is provided in the front wall of the upper trash receptacle below the floor thereof but above the upper edge of the walls of the lower newspaper receptacle. This newspaper slot permits newspapers to be slipped through the slot and fall into the lower newspaper receptacle for storage of the newspapers.

The lower newspaper receptacle has included within the receptacle base thereof a shuttle bar channel positioned below the floor of the lower newspaper receptacle beneath the newspapers being stored therein. A shuttle bar cooperates with the shuttle bar channel in a manner to pass from the front of the lower newspaper receptacle beneath the newspapers to the rear of the lower newspaper receptacle.

The receptacle base of the lower newspaper receptacle includes a twine receptacle within which a ball of binding twine is positioned. The binding twine is dispensed from the twine receptacle to the shuttle bar and interconnected with the forward edge of the shuttle bar. Passage of the shuttle bar through the shuttle bar channel will transfer the binding twine from one edge of the newspapers underneath the newspapers to the back edge thereof.

The lower newspaper receptacle includes relieved sections in the front and rear walls thereof to permit the edges of the newspapers stored therein to be exposed. Upon removal of the upper trash receptacle from the lower newspaper receptacle, the binding twine may be passed over the newspapers stored therein by means of the relieved sections and the ends of the binding twine appropriately joined to bind the newspapers into a neat bundle. For purposes of convenience, the shuttle bar includes a knife edge therein to cut the binding twine to an appropriate length.

An air vent is provided in the back wall of the upper trash receptacle and extends from a position slightly above the floor of the upper trash receptacle to a point at the upper edge of the back wall thereof. The air vent permits the easy insertion of trash bags within the upper trash receptacle by relieving the buildup of air pressure as the trash bags are inserted. In a like manner, the air vent permits the reduction of any vacuum resulting when the trash bags are removed from the upper trash receptacle and thus aids in the removal of the trash bags.

BRIEF DESCRIPTION OF DRAWINGS

FIG. 1 is a perspective view of the combination trash receptacle of the present invention in assembled position;

FIG. 2 is a cross-sectional view of the combination trash receptacle of the present invention taken along the lines 2—2 as shown in FIG. 1;

FIG. 3 is a perspective exploded view of the combination trash receptacle of the present invention;

FIG. 4 is an end sectional view of the shuttle bar of the combination trash receptacle of the present invention taken along the lines 4—4 of FIG. 3;

DETAILED DESCRIPTION OF INVENTION

Figure 5:
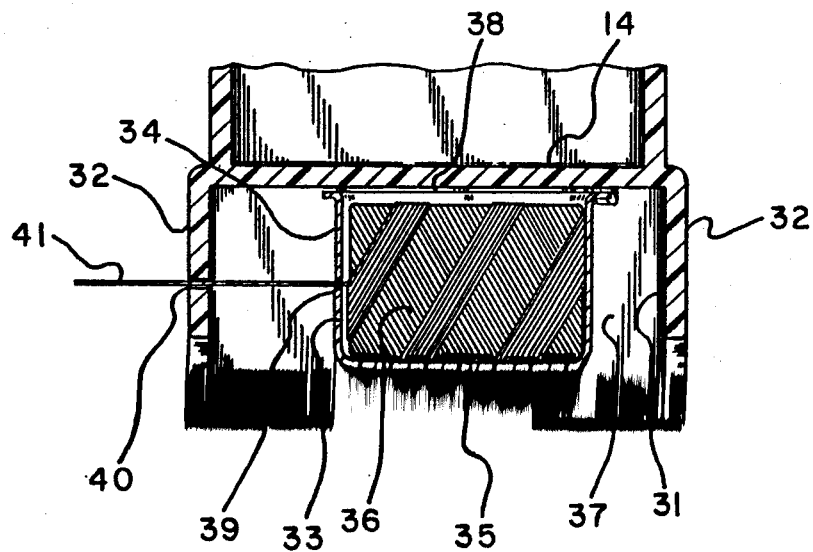
FIG. 5 is a side sectional view of the lower portion of the lower newspaper receptacle of the combination trash receptacle of the present invention taken along the lines 5—5 of FIG. 3.

The combination trash receptacle for storing newspapers separate from other trash is shown in FIGS. 1-6 of the drawings. The description of the invention will be taken generally in respect to all FIGS. 1-6 in the following description with specific reference being made to a particular figure when it is advantageous so to direct the general description to that specific figure. Otherwise, reference is to be made to all six figures as a whole.

Referring to FIG. 1, the combination trash receptacle 10 of the present invention is shown in assembled relationship. Referring to FIGS. 1-6 generally, the combination trash receptacle 10 generally includes a lower newspaper receptacle 11 and an upper trash receptacle 12.

The lower newspaper receptacle 11 includes a rectangular receptacle base 13. Superimposed upon the upper portion of the receptacle base 13 is a floor 14. The length and width of the floor 14 are slightly larger than the length and width of a common newspaper and are thus adapted to be able to accommodate in a flat position a newspaper lying upon the floor.

Extending upwardly from the floor 14, but slightly set inwardly from the outer edges thereof so as to form a nesting ledge 38, are front and rear walls 15 and 16 respectively and side walls 17. The height of these walls is a matter of choice but should be at least as high as to accommodate, stacked in a flat position, what would be considered a normal weekly receipt of newspapers and other flat printed material. The front wall 15 includes therein a large front relief 18 which extends down to the level of the floor 14. In a like manner, the rear wall 16 includes a more narrow rear relief 19 which extends down to the level of the floor 14.

The upper trash receptacle 12 includes a front wall 21, a rear wall 22 and opposed side walls 23. The dimensions of the front, rear and side walls of the trash receptacle 12 are such that these walls will pass downwardly over and outwardly of the front, rear and side walls of the lower newspaper receptacle 11, as more specifically shown in FIG. 2, with the lower edges 20 of the walls of the upper trash receptacle 12 coming into nesting engagement with the nesting ledge 38 when the upper trash receptacle 12 is in assembled relationship with the lower newspaper receptacle 11.

Again, as more specifically shown in FIG. 2, the upper trash receptacle 12 includes a newspaper slot 24 cut into the front wall 21 thereof. The newspaper slot 24 is positioned above the lower edge 20 of the front wall 21 a distance such as to be above the upper edges 25 of the walls of the lower receptacle 11. The newspaper slot 24 is of a length at least equal to the width of a common newspaper. In this manner, as more particularly evident from FIG. 2 of the drawings, when the upper trash receptacle 12 is assembled in nested relationship with the lower newspaper receptacle 11, newspapers may be slipped through the newspaper slot 24 and permitted to fall into stacked relationship within the lower newspaper receptacle 11.

The upper trash receptacle 12, as more particularly shown in FIG. 2 of the drawings, includes a floor 26 interconnected to the walls of the upper trash receptacle 12 at a point just above the upper edge of the newspaper slot 24. The floor 26 provides the foundation for the bottom of a trash bag 28 which is positioned within the upper trash receptacle 12 as shown in FIG. 2 of the drawings.

As an aid to the insertion and removal of the trash bag 28 from the upper trash receptacle 12, an air vent 29 is positioned within the rear wall 22 of the upper trash receptacle 12. The air vent 29 extends from a position slightly above the floor 26 of the upper trash receptacle 12 to the upper edge 27 thereof. The lower portion of the air vent 29 includes a vent hole 30 therein. As the trash bag is either inserted into the upper trash receptacle 12 or withdrawn therefrom, the air vent 29 will permit the exchange of air from or into the upper trash receptacle 12 to aid in the insertion and removal of the trash bag 28.

Figure 6:
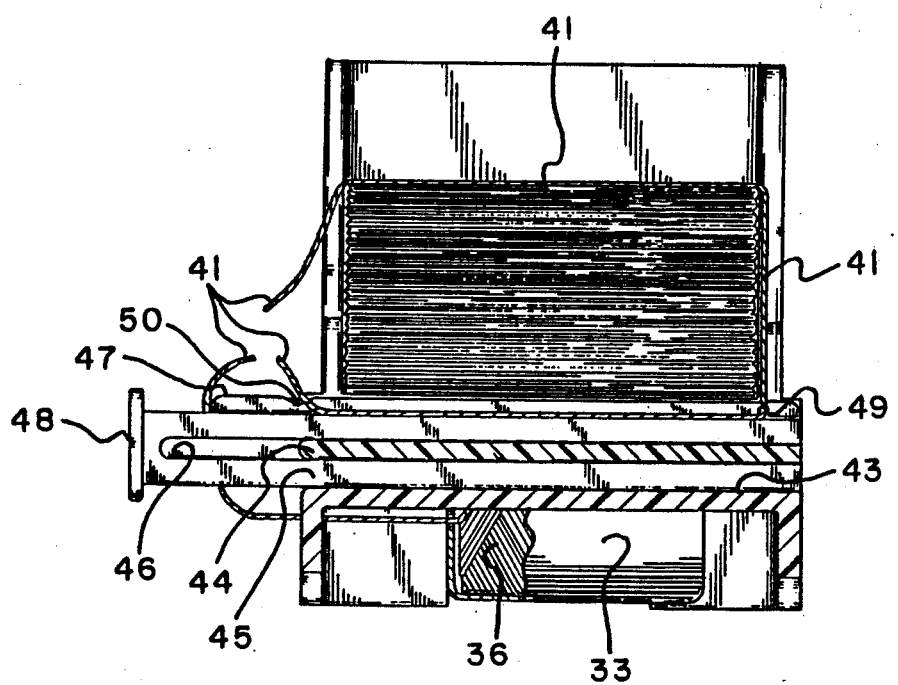
FIG. 6 is a side sectional view of the lower newspaper receptacle of the combination trash receptacle of the present invention taken along the lines 6—6 of FIG. 1.

Referring now more specifically to FIGS. 5 and 6, the combination trash receptacle of the present invention includes means for dispensing binding twine to bind the newspapers prior to their disposal. Positioned within the concavity 31 formed within the receptacle base 13 by the floor 14 and receptacle base walls 32 is a twine receptacle 33. The twine receptacle 33 is secured to the lower portion of the receptacle base floor 14 and is of a semicircular configuration having side retaining walls 34 and a bottom retaining wall 35 into which a twine ball 36 is positioned. A revolving closing door 37, appropriately secured in place to the bottom of the floor 14 by a door pivot 38, permits the twine receptacle 33 to be opened for receipt of the twine ball 36 and, thereafter, as shown in FIG. 6 of the drawings, closed to retain the twine ball 36 in place. In the alternative, a concave twine ball receptacle may be formed integral with and below the floor 14 and be in communication with an opening formed within the floor 14 so that the twine ball need only be dropped into place from above the floor.

The side retaining wall 34 of the twine receptacle 33 includes a first twine feed receptacle 39 through which the twine is permitted to pass. The twine passes further on to a second twine feed receptacle 40 within the receptacle base wall 32 of the receptacle base 13. As shown in FIG. 3 of the drawings, the twine 41 may thus be dispensed from the twine receptacle off of the twine ball for easy access and use in binding of the newspapers as to be hereinafter described.

As best shown in FIG. 3 of the drawings, the receptacle base 13 has positioned therein below the floor 14, a shuttle bar channel 43 which runs from the front to the rear of the receptacle base 13. The shuttle bar channel 43 is positioned below the floor 14 and thus passes beneath the newspapers to be placed within the lower newspaper receptacle 11 upon the floor 14 thereof. The shuttle bar channel 43 further includes a pair of guide rails 44.

The shuttle bar channel and its included guide rails 44 are designed to receive a shuttle bar 45. As shown in FIG. 4, the shuttle bar 45 is generally of rectangular configuration and includes a pair of opposed guide channels 46 which cooperate with the guide rails 44 of the shuttle bar 43. Positioned on the upper surface of the shuttle bar 45 is a shuttle bar standoff 47. The design of the shuttle bar 45 is such that it will pass within the shuttle bar channel 43 in a sliding fit with the guide channels 46 thereof engaged in mating relationship with the guide rails 44 of the shuttle bar channel 43. The shuttle bar standoff 47 projects upwardly from the shuttle bar 45 only a distance sufficient to pass slightly beneath the surface of the lowermost newspaper positioned upon the floor 14 of the lower newspaper receptacle 11 as shown more clearly in FIG. 6 of the drawings.

The shuttle bar 45 further includes a shuttle bar stop 48 at the rearmost end thereof. The shuttle bar stop 48 is of a length and width in excess of the dimensions of the shuttle bar such that, when the shuttle bar is moved into and out of the shuttle bar channel 43, the shuttle bar stop 48, when the shuttle bar 45 is fully inserted into the shuttle bar channel 43, will engage the outer edge of the receptacle base wall 32 to stop further movement of the shuttle bar 45 within the shuttle bar channel 43.

The shuttle bar standoff 47 includes in the forward edge thereof a twine grip 49. The twine grip 49 is essentially a Y-notch in the shuttle bar standoff which will grip and retain the leading edge of the twine 41.

The shuttle bar standoff 47 further includes a knife edge 50 positioned in the rearwardmost portion of the shuttle bar standoff 47. The knife edge 50, as more particularly shown in FIG. 4, is the uppermost portion of a knife blade 51 positioned within an appropriate slot 52 within the shuttle bar 45.

In use, when the combination trash receptacle has been filled with newspapers and trash, the upper trash receptacle 12 will be removed from its nesting relationship with the lower newspaper receptacle 11. The trash bag 28 within the upper trash receptacle 12 can be removed and the trash bag disposed in a conventional manner.

The newspapers within the lower newspaper receptacle 11 will then be disposed of subsequent to binding. The binding operation includes pulling from the twine ball an appropriate amount of binding twine 41, the leading edge of which is secured into the twine grip 49 of the shuttle bar standoff of the shuttle bar. The shuttle bar 45 is then inserted into the shuttle bar channel with the guide channels 46 of the shuttle bar engaging the guide rails 44 of the shuttle bar channel 43. The shuttle bar is then passed through the shuttle bar channel beneath the newspapers until the leading edge of the shuttle bar and its included binding twine 41 within the twine grip 49 extends beyond the rear wall 16 of the lower newspaper receptacle 11. At this point, the binding twine is removed from the twine grip 49 and the twine pulled beneath the newspapers up over the top of the newspapers and downwardly through the rear relief 19 across the top of the newspapers and through the front relief 18 downward across the front edge of the newspapers as shown in FIG. 6 of the drawings. After sufficient twine has been pulled from the twine ball, the twine is then cut on the knife edge 50 and the twine edges appropriately pulled securely around the newspapers and tied to bind the newspapers. Additional wraps of twine around the newspapers may be made by repeating the operation using the shuttle bar. The newspapers may then be removed from the lower newspaper receptacle 11 in their bound condition and disposed of in a conventional manner.

From the foregoing description of the combination trash receptacle of the present invention, it will be appreciated that there is provided a trash receptacle which can neatly and conveniently provide separate storage for newspapers together with a convenient and easy method of binding the same while, at the same time, providing an appropriate receptacle for the remainder of household trash and rubbish all in a neat and convenient package.

While the invention has been described in connection with what is presently considered to be the most practical and preferred embodiment thereof, it is to be understood that the invention is not to be limited to that particular embodiment, but, on the contrary, it is intended to cover various modifications and equivalent arrangements included within the spirit and scope of the appended claims.

What is claimed is:

1. A combination trash receptacle for storing newspapers and other trash separately comprising:
   a lower newspaper receptacle having a receptacle base, a floor superimposed thereupon of length and breadth of that of a common newspaper and having upwardly extending front, rear and opposed side walls;
   an upper trash receptacle having front, rear and opposed side walls dimensioned to nest with the upwardly extending front, rear and opposed side walls of the lower newspaper receptacle; and
   a floor within the upper trash receptacle whereby newspapers may be stored within the lower newspaper receptacle and other trash within the upper trash receptacle prior to disposal.

2. The trash receptacle of claim 1 further including twine transfer means within the lower newspaper receptacle for passing binding twine underneath newspapers stored therein as an aid in binding the newspapers into a bundle prior to disposal thereof.

3. The trash receptacle of claim 2 wherein the twine transfer means is a shuttle bar operating within a shuttle bar channel within the receptacle base beneath the newspapers and adapted to receive the binding twine and pass the twine beneath the newspapers.

4. The trash receptacle of claim 3 further including twine receptacle means within the receptacle base to receive, store and dispense the binding twine to the shuttle bar.

5. The trash receptacle of claim 2 wherein the front and rear walls of the lower newspaper receptacle have relieved sections therein to permit the binding twine to pass unobstructed completely around the newspapers prior to binding.

6. The trash receptacle of claim 4 wherein the front and rear walls of the lower newspaper receptacle have relieved sections therein to permit the binding twine to pass unobstructed completely around the newspapers prior to binding.

7. The trash receptacle of claim 4 further including an opening within at least one of the walls of the upper trash receptacle below the floor therein to permit newspapers to be passed into the lower newspaper receptacle when the upper trash receptacle and the lower newspaper receptacle are in nested relationship.

8. The trash receptacle of claim 7 wherein the upper trash receptacle further includes an air vent in at least one wall of the upper trash receptacle extending from a region adjacent the floor thereof to a region near the top of the wall to aid in insertion and removal of trash bags from the upper trash receptacle.

9. The trash receptacle of claim 1 further including an opening within at least one of the walls of the upper trash receptacle below the floor therein to permit newspapers to be passed into the lower newspaper receptacle when the upper trash receptacle and the lower newspaper receptacle are in nested relationship.

* * * * *